(12) United States Patent
Müller et al.

(10) Patent No.: US 6,583,914 B1
(45) Date of Patent: Jun. 24, 2003

(54) DEVICE FOR SCANNING AN OBJECT

(75) Inventors: Eckart Müller, Nürnberg (DE); Ulf Kruse, Hannover (DE)

(73) Assignee: Universität Hannover, Hannover (DE)

(*) Notice: Subject to any disclaimer, the term of this patent is extended or adjusted under 35 U.S.C. 154(b) by 0 days.

(21) Appl. No.: 09/857,015

(22) PCT Filed: Nov. 2, 1999

(86) PCT No.: PCT/DE99/03774

§ 371 (c)(1),
(2), (4) Date: Aug. 13, 2001

(87) PCT Pub. No.: WO00/33120

PCT Pub. Date: Jun. 8, 2000

(30) Foreign Application Priority Data

Nov. 30, 1998 (DE) .......................... 198 55 140

(51) Int. Cl.$^7$ .............................. G02B 26/08
(52) U.S. Cl. .................... 359/212; 359/198; 359/833; 359/872
(58) Field of Search .................... 359/198, 201, 359/209, 211, 212, 223, 224, 226, 838, 871, 872, 850, 857, 833

(56) References Cited

U.S. PATENT DOCUMENTS 5,071,239 A   12/1991   Hoffman et al.
5,864,417 A * 1/1999   Ho ............................... 359/201
5,870,219 A * 2/1999   Plesko ........................ 359/198

FOREIGN PATENT DOCUMENTS

| DE | 37 05 042 | 9/1987 |
|----|-----------|--------|
| DE | 297 12 018 | 9/1997 |
| EP | 0 005 244 | 11/1979 |
| EP | 0 178 037 | 4/1986 |
| EP | 0 219 620 | 4/1987 |
| EP | 0 226 428 | 6/1987 |
| EP | 0 575 988 | 12/1993 |
| EP | 0 814 358 | 12/1997 |
| WO | WO 89/05512 | 6/1989 |
| WO | WO 96/11420 | 4/1996 |

* cited by examiner

Primary Examiner—Euncha Cherry
(74) Attorney, Agent, or Firm—Husch & Eppenberger, LLC; Robert E. Muir; Richard J. Musgrave

(57) ABSTRACT

The invention relates to a device for scanning an object using a scanning beam which is directed into a rotating deflector and which is diverted onto the object at a controllable diversion angle using a diverting unit that is arranged in a moveable manner. The diversion angle of the diverting unit is adjusted according to the centrifugal force acting upon said diverting unit and according to the rotational speed of the deflector.

20 Claims, 2 Drawing Sheets

DEVICE FOR SCANNING AN OBJECT

CROSS REFERENCE TO RELATED APPLICATIONS

This application claims foreign priority benefits under Title 35, United States Code §119, of German Application 198 55 140.1 filed on Nov. 30, 1998, and of PCT Application No. PCT/DE99/03774 filed on Nov. 29, 1999.

1. Technical Field of the Invention

The invention concerns an apparatus for scanning an object with a scanning beam which is guided into a rotating diverter unit and deflected with a movably mounted deflector unit at a controllable angle of deflection onto the object.

2. Description of the Related Art

Corresponding apparatuses based on the optical principle are known in particular as laser scanners, and are used e.g. for laser-radar applications. Here an object is scanned with a coherent light source, i.e. a laser beam, and the distance from the scanned measuring points is determined by a laser-optics rangefinder. Thus it is possible to produce a three-dimensional image of the scanned surface of the object of measurement.

Corresponding diverter units are also used for laser printers or for writing on, checking and playing compact discs.

In EP 575 988 A1 is disclosed a laser scanner for laser printers and in EP 178 037 A2 is disclosed a corresponding laser scanner for the quality control of semiconductor wafers, in which a laser beam is diverted with a rotating polygon mirror onto a stationary elongate deflector mirror and guided onto the printer drum. On rotation of the polygon mirror, the laser beam sweeps across the longitudinal axis of the deflector mirror and one-dimensional scanning takes place.

So-called galvanometer scanners in which the above-mentioned deflector mirror is tiltable are known for scanning a two-dimensional surface. This traditional embodiment is shown in FIG. 4. By rapid rotation of the polygon mirror and slow rotation or tilting of the deflector mirror, the object is two-dimensionally scanned in each case line by line in Cartesian coordinates.

In the above-mentioned laser scanners, the deflector mirror must be relatively wide due to diversion of the laser beam by the polygon mirror. Since the drive motors for both mirrors must be integrated in the laser scanner, the designs are quite large. Also coordinated control of the mirrors is elaborate.

In EP 219 620 A2 is described a rapid scanning device for maximum diversion speeds, in which a laser beam is diverted with two symmetrical cylinder mirrors which are set in rotation. Here the mirror coatings are at a small angle to the axis of rotation, so that the airborne cylinder mirror which is set in rotation by an air stream wobbles and diverts the laser beam onto a circular path. The laser beam is guided onto a corresponding second cylinder mirror, so that a three-dimensional pattern is formed as a function of the respective speeds of revolution and mirror diameters.

In WO 96/11420 is described a laser scanner for two-dimensional room scanning, in which a laser beam is diverted with two mirrors standing relative to each other. The diverter units are controlled with a computer system. This requires high expenditure on control. Also the space requirements for the two diverter units and the manufacturing costs are relatively high.

For scanning bar codes, in WO 89/05512 is described a rotary scanner in which a laser beam is guided into an inclined mirror which is arranged in a rotating cylindrical housing. The laser beam emerges from an opening on the circumference of the housing and encounters a number of inclined deflector mirrors which form a pyramid with a polygonal base surface. The rigidly mounted deflector mirrors deflect the laser beam onto the object, wherein the inclination and the number of deflector mirrors determine the scan pattern. The scan surface is however here disadvantageously also limited by a narrow region for e.g. a bar code, and it is not possible to scan a complete surface systematically.

In DE-A-37 05 042 A1 is described an optical scanning apparatus in which diverter mirrors are arranged on a rotatable carrier. The diverter mirrors are in each case arranged at the same non-right-angled angle to a radius of the carrier, so that a scanning beam is diverted onto a tilt mirror at an angle altered by the rotation. The tilt mirror is movably attached to a stepping motor. The tilt angle of the tilt mirror is discretely varied as soon as a horizontal path has been scanned by rotation of the carrier. The angle of the diverter mirrors, the speed of rotation of the carrier and the tilt angle of the tilt mirror must be synchronized with each other very precisely in order to be able to scan a surface in a controlled manner. Also the size of the scanning apparatus is relatively large, particularly because the tilt mirror is actively operated with the stepping motor.

In U.S. Pat. No. 5,071,239 is described a scanning telescope in which a scanning beam is guided onto a diverter mirror and directed by a deflector unit onto a lens. The deflector unit has a curved surface, so that the deflected laser beam is diverted from the normal. The deflector unit is mounted stationarily.

It is therefore possible to scan a circular path with the arrangement. The scanning speed here depends on the speed of rotation of the diverter mirror. The radius of the scanned circular path can be controlled by horizontal displacement of the diverter mirror 11. This disadvantageously requires elaborate coordinated control and an additional actuator.

SUMMARY OF THE INVENTION

It was therefore the aspect of the present invention to provide an apparatus for scanning a surface with a scanning beam, which allows a two-dimensional scan path with only one drive unit. The apparatus should have a small size, require little expenditure on control and be able to detect and scan the surface of an object completely.

The aspect is achieved by the apparatus with the characteristics of patent claim 1. Advantageous embodiments are described in the subsidiary claims and the specification. The above listed aspect is just one of the innumerable aspects associated with the present invention and should not be considered as all-inclusive.

The deflector unit is arranged in such a way that the angle of deflection of the deflector unit is adjusted as a function of the centrifugal force and so as a function of the speed of the diverter unit. Hence the scan path is fixed by the speed of rotation of the drive for the diverter unit, and advantageously an additional drive for the deflector unit or additional control means can be eliminated. The apparatus can thus be integrated in small assemblies. Also the expenditure on control and components is minimal.

The diverter unit is advantageously arranged in a housing rotatable about an axis of rotation of the housing. The deflector unit is attached to the circumference of the housing, so that speed-related centrifugal forces act on the deflector unit and bend it. The diverter unit and the deflector unit are in this case aligned with each other in such a way that the scanning beam is guided from the diverter unit onto the deflector unit and deflected by the latter at a speed-related angle onto the object.

The deflector unit is for this purpose advantageously attached to one end of a spring arm. The other end of the spring arm is attached to the housing. The material properties of the spring arm then determine the degree of diversion in proportion to the speed-related centrifugal force acting on the deflector unit.

The housing preferably has a recess for receiving the spring arm, so that the spring arm is integrated in the housing and the housing surface ends flush.

The spring arm can for example be made of plastic or metal. Advantageously the spring arm is a leaf spring. The bending properties of the leaf spring determine the speed-related diversion behaviour.

To compensate for the imbalance of the housing, which is caused amongst other things by a spring arm, at least one counterweight is provided on the circumference of the housing.

Preferably two additional spring arms which are mounted on the circumference of the housing at an angle of 120° each in relation to the spring arm, are provided as the counterweights. At the free ends of the additional spring arms are respectively provided two weights.

The housing is advantageously a hollow cylinder through which the scanning beam can be guided. When using an optical measuring beam, e.g. a laser beam, it is advantageous if the diverter unit is a prism arranged in the hollow cylinder and the deflector unit is a mirror.

BRIEF DESCRIPTION OF THE DRAWINGS

The invention is described in more detail below with the aid of the attached drawings. They show.

DETAILED DESCRIPTION

Figure 1:
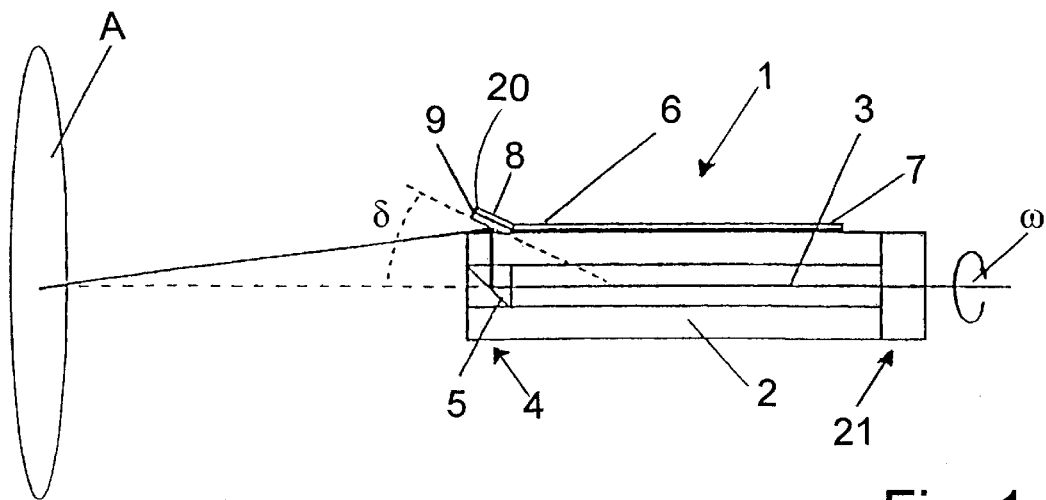
FIG. 1: longitudinal section of the laser scanner according to the invention with a leaf spring and mirror deflector unit when the housing is at a standstill.

Referring now to FIG. 1, the invention is described with the aid of a laser scanner 1 with a spring arm 8, preferably a leaf spring, and mirror deflector unit 6. In the longitudinal section in FIG. 1, the laser scanner 1 is shown when the housing 2 is at a standstill and in FIG. 2 it is shown at a low speed of the housing 2. A housing 2 is provided preferably in the form of a hollow cylinder which is rotatably mounted. The spring arm 8 is received by a recess in the housing 2. For this purpose the housing 2 can be driven with a drive unit, not shown. The speed of the housing 2 can be controlled with adequately well-known means. A scanning beam 3; e.g., a laser beam, is guided into the first end 21 of the housing 2 in such a way that it extends centrally over the longitudinal axis of housing 2. At the second end 4 of the housing 2 is arranged a diverter unit 5 in the form of a prism for diverting the scanning beam 3 radially outwards onto a deflector unit 6. The deflector unit 6 has a mirror 9.

The deflector unit 6 is arranged at the first end 7 of the spring arm 8 which extends along the longitudinal axis of the cylindrical housing 2 on its circumference. The spring arm 8 is provided on the circumference of the housing 2 to compensate for any imbalance and serves as a counterweight. In alternative embodiments, there are two spring arms 8 serving as at least one counterweight to compensate for any imbalance. The spring arms 8 have free ends mounted on the circumference of the housing 2 at an angle in relation to the compensating spring arms 8, wherein at each of the free ends of the compensating spring arms 8 includes a weight. In another alternative embodiment, the two compensating spring arms 8 function as at least one counterweight. The spring arms 8 have free ends, which are mounted on the circumference of the housing 2 at an angle, of substantially 120°, wherein at each of the free ends of the compensating spring arms 8 includes a weight. A second end 20 of the spring arm 8 is attached to the housing 2 e.g., by gluing, bolting or riveting. The housing 2 can for this purpose have a recess into which the spring arm 8 is introduced flush, so that the surface of the cylindrical housing 2 ends smoothly.

The scanning beam 3 is deflected by the deflector unit 6 onto an object. By means of an adequately well-known measurement pick-up and measurement evaluation unit, the reflection of the scanning beam 3 is evaluated and laser-optics rangefinding is performed.

Due to rotation of the housing 2, the deflector unit 6 is acted upon by centrifugal forces which depend on the speed. Hence the angle of diversion δ of the scanning beam 3 onto the object can be controlled as a function of speed. Accordingly, the deviation r of the scanning beam 3 or the angle of diversion δ of the deflector unit 6 or mirror 9 can be greater at a higher speed than at a low speed. This property becomes clear in FIG. 3 with the aid of the laser scanner 1 at high speed, if this drawing is compared with the laser scanner 1 shown in FIG. 2 at low speed.

Figure 4:
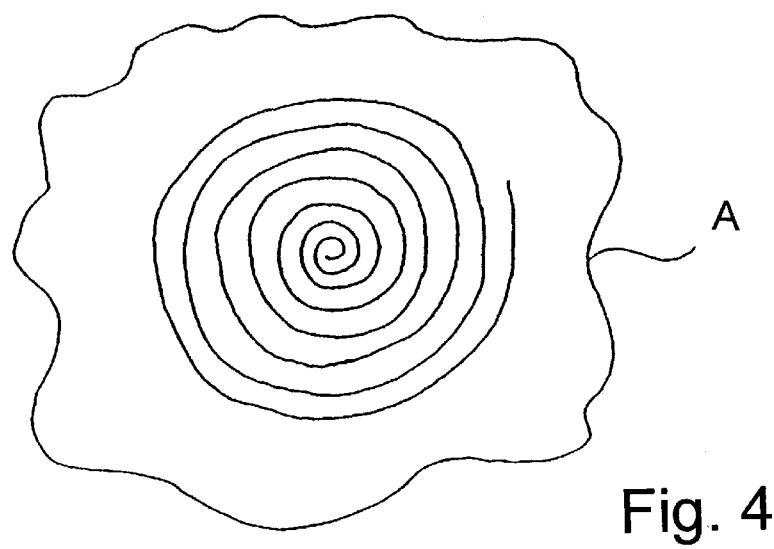
FIG. 4: scan path of the measuring beam on the object of measurement with a continuous increase in speed.

To scan a complete surface A of an object, the speed is continuously increased or decreased. Then, due to the continuous variation in centrifugal force, the deflection of the deflector unit 6 also decreases and increases and the scanning beam 3 describes on the object the spiral scan path shown in FIG. 4. To evaluate the reflections of the scanning beam 3 for scanning the object, the instantaneous scanning points must be known. These can be calculated directly from the speed and the angle of rotation ω of the cylindrical housing 2, if the spring properties are known. The angle of rotation ω can be determined in an adequately well-known manner e.g. with an angle measuring device or time measurement as a function of a zero position signal. For this purpose the housing 2 can have a corresponding marking of a zero position.

Figure 5:
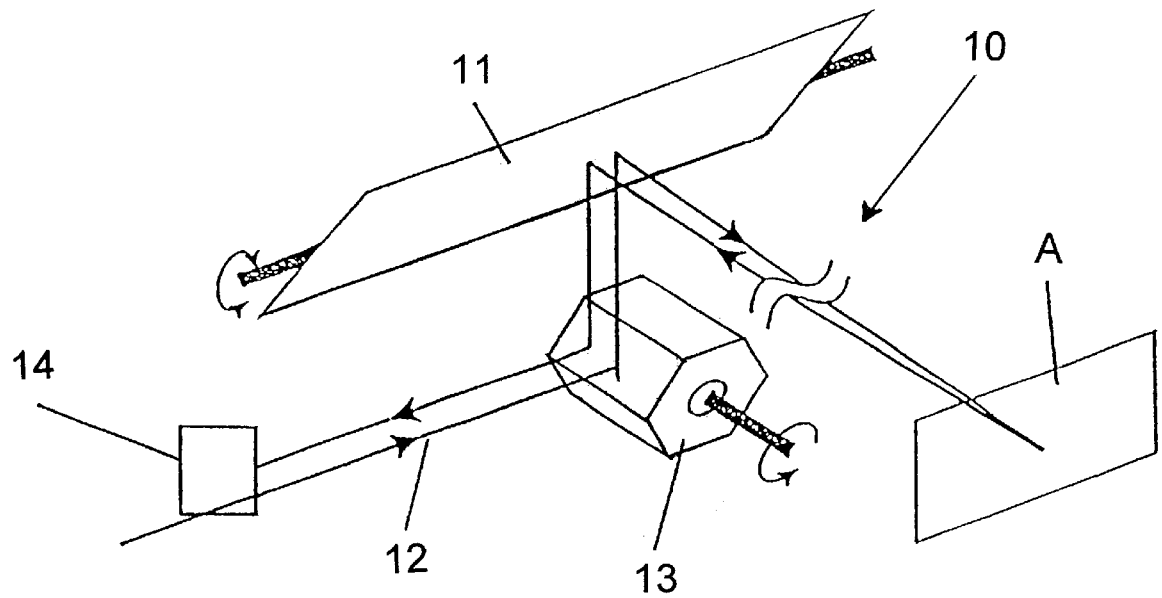
FIG. 5: schematic diagram of a conventional galvanometer scanner.

In FIG. 5 is shown a conventional galvanometer scanner 10. Unlike the proposed apparatuses, here an elongate tilt mirror 11 with an additional controlled drive unit for moving the tilt mirror 11 is provided. A laser beam 12 is guided onto a rotating polygon mirror 13 and diverted by the latter onto the tilt mirror 11. The angle of diversion of the laser beam 12 here depends on the angle position of the polygon mirror 13. During the time in which the laser beam 12 is diverted by one of the mirror surfaces of the rotating polygon mirror 13, the latter traverses a whole row of the tilt mirror 11 and hence also of the scan surface A. The tilt mirror 11 is moved very slowly relative to the rotation of the polygon mirror, and row and line scanning of the scan surface A takes place. The laser beam 12 is reflected back by the scan surface and detected by a photodiode 14. The depth of the surface of the corresponding scanning point is determined by time measurement on the known laser-optics principle.

Figure 2:
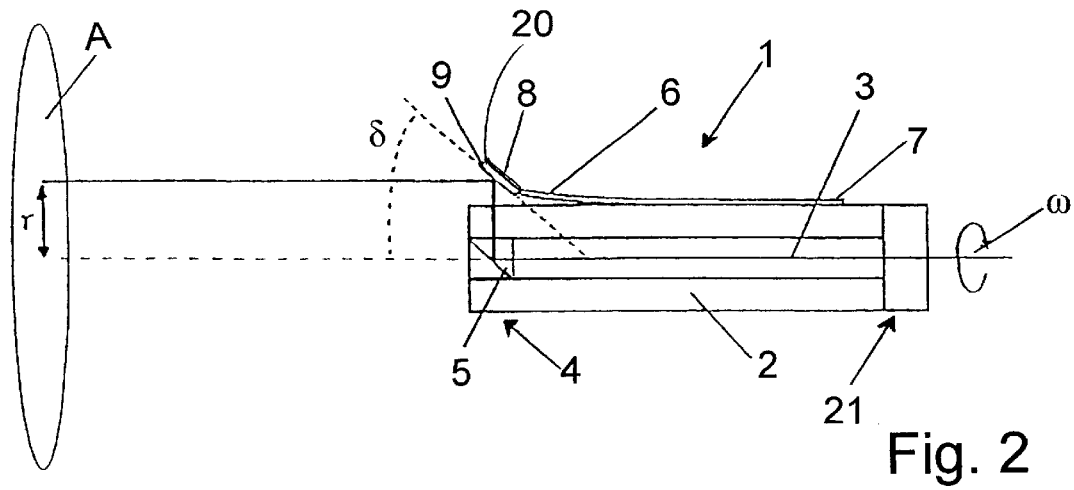
FIG. 2: longitudinal section of the laser scanner according to the invention with a leaf spring and mirror deflector unit at a low speed of the housing.
Figure 3:
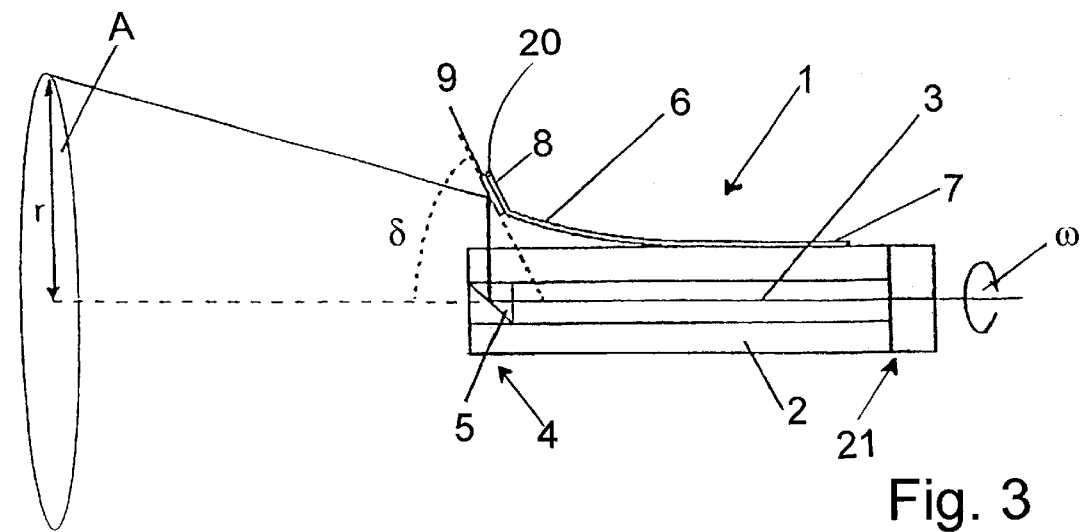
FIG. 3: longitudinal section of the laser scanner according to the invention with a leaf spring and mirror deflector unit at a higher speed of the housing.

A comparative examination of this galvanometer scanner 10 shown, with the laser scanner 1 with integrated spring arm 8 and mirror deflector unit 6 which is shown in FIGS. 1 and 2, shows that the space requirements and expenditure on control can be considerably minimized with the apparatus with the characteristics of the invention.

What is claimed is:

1. An apparatus for scanning objects with a scanning beam which comprises: a rotating diverter unit for the deflection of a scanning beam, which is incident axially to a rotational axis of the rotating diverter unit onto a movable deflector unit arranged outside the rotational axis, for deflecting the scanning beam at a controllable deflection angle onto an object, and wherein the movable deflector unit is arranged in such a way that the deflection angle of the movable deflector unit is adjusted as a function of the centrifugal force acting on the movable deflector unit and therefore as a function of the speed of the rotating diverter unit.

2. The apparatus according to claim 1, wherein the rotating diverter unit is arranged in a housing rotatable about an axis of rotation of the housing and the movable deflector unit is mounted on a circumference of the housing.

3. The apparatus according to claim 2, wherein the movable deflector unit is attached to a first end of a spring arm and a second end of the spring arm is mounted on the circumference of the housing.

4. The apparatus according to claim 3, wherein the housing has a recess for receiving the spring arm.

5. The apparatus according to claim 3, wherein the spring arm is made of plastic.

6. The apparatus according to claim 3, wherein the spring arm is a leaf spring.

7. The apparatus according to claim 3, wherein the spring arm is made of metal.

8. The apparatus according to claim 2, further including at least one counterweight is provided on the circumference of the housing to compensate for any imbalance.

9. The apparatus according to claim 8, wherein the at least one counterweight includes two compensating spring arms, having free ends, which are mounted on the circumference of the housing at an angle in relation to the compensating spring arms, wherein at each of the free ends of the compensating spring arms includes a weight.

10. The apparatus according to claim 2, wherein the housing includes a hollow cylinder.

11. The apparatus according to claim 1, wherein the rotating diverter unit includes a prism.

12. The apparatus according to claim 1, wherein the movable deflector unit includes a mirror.

13. The apparatus according to claim 8, wherein the at least one counterweight includes two compensating spring arms, having free ends, which are mounted on the circumference of the housing at an angle, of substantially 120°, each in relation to the compensating spring arms, wherein at each of the free ends of the compensating spring arms includes a weight.

14. A process for scanning objects with a scanning beam, which comprises:

deflecting a scanning beam with a rotating diverter unit where the scanning beam is incident axially to a rotational axis of the rotating diverter unit onto a movable deflector unit arranged outside the rotational axis, for deflecting the scanning beam at a controllable deflection angle onto an object; and arranging the movable deflector unit in such a way that the deflection angle of the movable deflector unit is adjusted as a function of the centrifugal force acting on the movable deflector unit and therefore as a function of the speed of the diverter unit.

15. The process according to claim 14, further including:

arranging the rotating diverter unit in a housing rotatable about an axis of rotation of the housing; and mounting the movable deflector unit on the circumference of the housing.

16. The process according to claim 15, further includes:

attaching the movable deflector unit to a first end of a spring arm; and mounting a second end of the spring arm is mounted on a circumference of the housing.

17. The process according to claim 15, further includes receiving the spring arm within a recess within the housing.

18. The process according to claim 15, further includes:

providing at least one counterweight on a circumference of the housing to compensate for any imbalance.

19. The process according to claim 14, wherein the step of defecting a scanning beam with a rotating diverter unit includes utilizing a prism as the rotating diverter unit.

20. The process according to claim 14, wherein the step of arranging the movable deflector unit includes utilizing a mirror as the movable deflector unit.

* * * * *

UNITED STATES PATENT AND TRADEMARK OFFICE
CERTIFICATE OF CORRECTION

PATENT NO. : 6,583,914 B1
DATED : June 24, 2003
INVENTOR(S) : Eckart Müller and Ulf Kruse It is certified that error appears in the above-identified patent and that said Letters Patent is hereby corrected as shown below:

<u>Title page,</u>
Item [22], PCT Filed, date should be -- November 29, 1999 --.

Signed and Sealed this

Twenty-fifth Day of November, 2003

JAMES E. ROGAN
*Director of the United States Patent and Trademark Office*